United States Patent Office 2,821,356
Patented Jan. 28, 1958

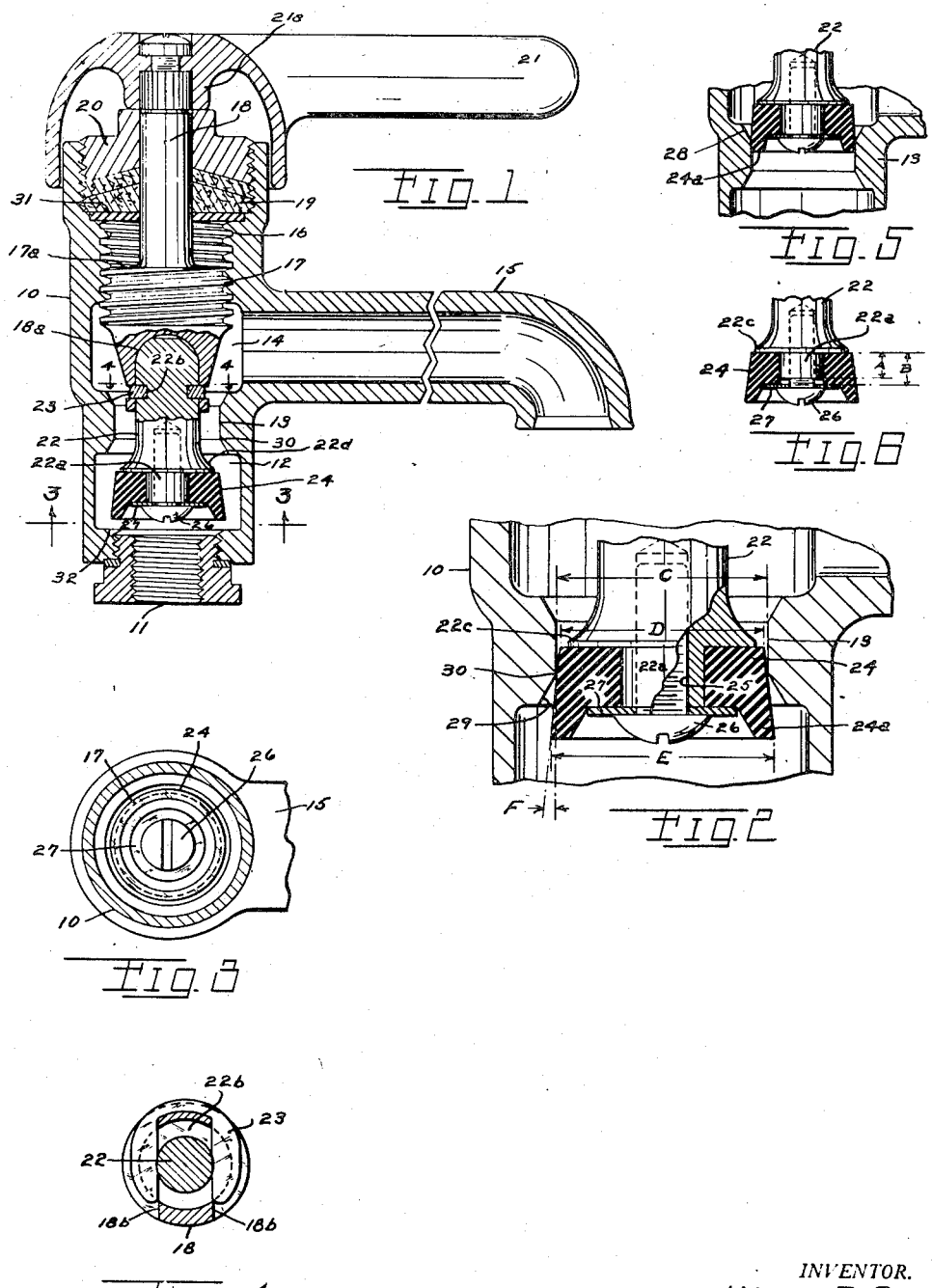

2,821,356

VALVE

Henry J. Rand, Cleveland, Ohio, assignor to Magic Seal, Inc., Cleveland, Ohio, a corporation of Ohio Application February 23, 1954, Serial No. 411,851

2 Claims. (Cl. 251—333)

This invention relates to improvements in a valve and more particularly to a drip proof valve which is opened and closed by a feather touch.

This application is a continuation-in-part of my copending application Serial No. 71,092, filed January 15, 1949, now abandoned for Valve.

One of the objects of the present invention is to provide a valve of the type described which is not complicated to manufacture or difficult to service. Prior valves and faucets of this type have been difficult to assemble and service and generally they have been comprised of so many parts that they were difficult and complicated in their manufacture.

Another object of the present invention is to provide a novel valve wherein the pressure of the controlled fluid is relied upon to aid in the sealing of the valve when closed, but wherein the valve washer may be introduced to its operative position while attached to its operating stem by introducing the same from the downstream side of the valve housing.

Still another object of the present invention is to provide a novel valve of the plug type closing in the direction of fluid flow wherein the parts are so dimensioned and carefully constructed to provide a valve which closes and opens very easily, which provides a drip proof closure, which has very little wear over a long period of use, and yet a valve requiring a small number of parts which are easily manufactured and assembled.

Other objects and advantages of my invention will be apparent from the accompanying drawings and description, and the essential features will be set forth in the appended claims.

In the drawings,

Fig. 1 is a central sectional view through a faucet equipped with my invention;

Fig. 2 is an enlarged sectional view through the valve portion of Fig. 1 and showing the valve in closed position;

Fig. 3 is a fragmental sectional view taken along the lines 3—3 of Fig. 1;

Fig. 4 is a fragmental sectional view taken along the line 4—4 of Fig. 1;

Fig. 5 is a view of the valve portion of Fig. 1 illustrating how the valve is assembled by pushing the washer from the top down;

Fig. 6 is a sectional view through the valve of Fig. 1 showing the manner of assembling the valve washer upon the stem.

My invention is applicable to many types of valves and faucets and I have chosen to illustrate the same as applied to a well known type of faucet. Hereafter the word faucet will be used in connection with the description but it should be understood that my invention is equally applicable to many types of valve.

As shown in Fig. 1 I have shown a faucet body 10 having an inlet opening 11 at the bottom adapted to be attached to a suitable conduit. Just above the inlet there is a valve chamber 12 leading to a bore 13 through which the valve operates. Above the bore is an enlarged chamber 14 which leads to the outlet spout 15. Obviously, chamber 12 is at the upstream end of the bore 13 and chamber 14 is at the downstream end. Above chamber 14 the housing is provided with the usual coarse threads 16 which coact with threads 17 on a valve stem 18 which extends through the upper portion of the housing where the stem is sealed by means of packing 19 held in place by a packing nut 20 which is threaded into the upper portion of the housing. The top of the valve stem is nonrotatably united with the faucet handle 21 in a usual manner. The lower end 22 of the valve stem might be made integral with the stem 18 but, preferably, I mount the valve stem portion 22 so that it is rotatable relative to the valve stem 18 for a purpose later disclosed. To this end, the upper end of stem portion 22 enters a recess 18a in the lower end of the valve stem and is held rotatably therein by means of a U-shaped pin 23 which slides into the milled slots 18b of the stem 18 and engages in the annular groove 22b of the stem portion 22. The stem portion 22 is thus fixed longitudinally relative to the stem 18 but may rotate therein.

On the lower end of stem portion 22 is mounted the valve seal or washer 24. Means must be provided to see that the valve washer is firmly held against the lower end of the stem portion 22 to avoid chatter and means must also be used to insure that the valve retains a suitable shape as will presently appear.

One means is shown here for holding the valve washer firmly against the valve stem and for maintaining the proper shape of the washer. Reference may be had to my copending application Serial No. 71,093, filed January 15, 1949, for other means of accomplishing the same result. Referring to Figs. 2 and 6, a projection 22a is formed in the center of the stem portion 22 extending downwardly therefrom and provided with a thread 25 which also extends upwardly into the stem portion 22 to receive a screw 26 which holds the washer in place. The dimension A of this projection 22a as indicated in Fig. 6 is less than the dimension B of the washer. In one form of my device where the washer is approximately $7/16$ inch in diameter, the dimension A is .105 inch while the dimension B is .125 inch. Then when the metal washer 27 is placed beneath the head of screw 26, the screw is then drawn down tight from the position of Fig. 6 to that of Fig. 2. This causes the rubber material of the washer 24 to press firmly against the stem portion 22 but is not sufficient to distort the washer. I find that if rubber is used for the washer 24 having a durometer hardness of from 40 to 50 up to 75 or a little more, in a washer of approximately $7/16$ inch diameter, the pulling of the dimension B from .125 inch down to .105 inch gives sufficient compression to hold the washer tightly against the flared out flanged bottom 22c of the stem portion 22. I find also that under these conditions there is not enough bulging outwardly of the tapered sides of the washer to badly effect the sealing action which will presently be described.

Since the dimensions of the washer and the parts into which it seals must be very carefully chosen, I will describe one form of my device in detail so that the principles will be understood. Referring to Fig. 2 in a faucet where the bore 13 has a diameter, dimension C of .4218 inch corresponding to $27/64$ inch, I utilize a washer 24 having a top diameter D of .406 inch corresponding to $13/32$ inch. The sides of the washer 24 flare downwardly and outwardly from the top at an angle F of about 5 to 10 degrees to the vertical. In the drawings shown, this angle is about 5½ degrees. The bottom diameter E of the washer in the form shown is .442 inch which is slightly more than 7/16 inch. The flange 22c must support almost the entire upper surface of the washer 24 in the form of my invention shown here, in order to prevent singing or chatter of the valve. I find that in valves up to about one inch diameter bore, where the upper face of the plug or washer 24 is held rigid by being held against a flat surface like the flange 22c, if the unsupported top wall of the washer outside of the flange 22c is more than about 1/16 of an inch, there is undesirable noise when the valve is opened and closed. Furthermore, the largest diameter of flange 22c should be D minus 0.010 inch, plus or minus 0.005 inch. These values are critical for a quiet valve. In my copending application mentioned above, I disclose and claim other manners of holding the upper portion of the washer rigid against chattering, but the form shown herein operates in a very satisfactory manner.

Where, in the specification and claims, I have used expressions referring to means supporting or reinforcing the valve plug "substantially out to the periphery of its base of smaller diameter" or that the "face (22c) being only slightly less in diameter than the smaller base (diameter D) of the plug," and similar expressions, I intend to convey the idea that the support or reinforcement at the downstream end of the valve plug, leaves only a narrow annular resilient cushion between the supporting or reinforcing surface and the bore 13. It is obvious that this may vary according to the circumstances. Referring to Figs. 2 and 7, the thing which is to be avoided is the extrusion of the resilient plug material 24 in Fig. 2 and 24′ in Fig. 7 upwardly around the periphery of the flange 22c due to the pressure of the fluid below the valve plug. With a given dimension D and a given diameter of the flange 22c and a givn durometer hardness of the plug 24 or 24′, obviously, a low fluid pressure might not extrude the resilient plug upwardly in the annular unsupported resilient cushion region but a higher fluid pressure might do so. Conversely, with all of the dimensions fixed, a greater durometer hardness of the plug 24 or 24′ might prevent extrusion where a softer resilient material might be extruded. I, therefore, combine the unsupported resilient cushion area around the periphery of the smaller diameter or upper diameter of the plug 24 and 24′ with the hardness of the plug material and the fluid pressure acting against the plug, so that extrusion of the plug material upwardly around the flange 22c will not take place under any given set of conditions.

Sufficient flexibility must be provided at the lower end of the washer to permit the flaring sides to be squeezed inwardly as shown in Fig. 5 when the washer is passed downwardly through the bore 13 and to contribute a slight flexibility outwardly to assist in the sealing action as illustrated in Fig. 2. One manner of providing this flexibility is to provide a hollow cupshape portion at the lower end of the washer by the peripheral flange 24a extending downwardly. The metal washer 27 engaging the bottom of the cupshape portion to hold the washer firmly against the stem portion 22 is approximately 5/16 inch diameter in the instant form.

It results from the above construction that the faucet is easily assembled and disassembled by passing the parts downwardly from the top portion of the housing 10 as is usual and desirable in faucets of this character. With the washer properly secured to the stem portion 22, the stem and washer are pushed downwardly through the bore 13 as shown in Fig. 5. The upper end of the bore is flared outwardly as indicated at 28 in order to cam the washer flange 24a inwardly for this operation.

When the valve is in operating position as shown in Fig. 1 a turn of the handle 21 serves to move the valve plug upwardly into the bore 13 to the position shown in Fig. 2. The lower end of the bore 13 has its walls either flared outwardly as indicated at 29 or provided with a slightly curved or chamfered edge so as to provide a line sealing contact around an annular zone at the point 30 indicated in Fig. 2. Obviously, the bore 13 might be somewhat smaller or somewhat larger than that shown and still coact with the valve washer 24 of the dimensions indicated. In such a case, the line seal along the zone 30 would occur either at a lower or at a higher level on the washer. The faucet will operate with a feather touch, because all that is necessary for a perfect seal is the simple line contact along the zone 30. After this the fluid under pressure aids in the sealing action. This seal will hold almost any pressure close to zero on up.

Attention is called to the slight taper on the side walls of the washer 24. If this flares too sharply outwardly there is a tendency for the valve to sing, and if the flare is too little in the form shown in Fig. 2 then it tends to produce a water hammer. I have found 5 to 7 degrees angle at the angle F to be satisfactory. I have deliberately placed large quantities of dirt and sand in water for testing my faucet and find that the action of pulling the tapered plug 24 upwardly into the bore 13 causes a wiping action along the side walls of the washer so that the dirt is wiped away and a clean seal is produced. Obviously, if the washer became worn, then it would be only necessary to pull the washer plug slightly farther upward into the bore 13 in order to produce a good seal. In actual operation several million times there has been insufficient wear of the washer 24 to call for any adjustment.

The swivel mounting of the stem portion 22 in the main stem 18 prevents any scuffing of the rubber of the washer seal. This causes the seal to be pulled in and out rather than twisted.

Preferably, means is provided to prevent the pulling of the plug so far up into the bore 13 that a good seal with line contact is not provided. To this end I have arranged for the upper shoulder 17a of the thread 17 to abut against a plate 31 which underlies the packing gland when the upper limit of movement is reached. This occurs while the washer plug is still in position to make a good seal at the zone 30. Stop means is also provided to prevent the running of the washer 24 so far downwardly that it would jam against the shoulder 32 indicated in Fig. 1. To this end a boss 21a on the handle abuts against the packing nut 20 so that the washer cannot be moved any lower than shown in Fig. 1.

It has been mentioned that, in any form of my device, the sealing plug may be solid with some compressibility or it may have a solid portion of thickness B (Fig. 6) and a peripheral flange 24a extending therebelow. If such a flange is provided, it should extend below the solid portion of the plug for a distance not substantially greater than the solid thickness B. This is for the purpose of equalizing the pressure inside and outside of this flange and to prevent undesirable stretching of this flange radially outwardly and possibly folding back onto the outer side face of the solid portion of the plug due to fluid pressure inside the cupshape plug bottom, just as the plug moves into sealing position.

The support of the top of the plug by the flaring stem bottom 22c, extending almost to the periphery of the plug top, is valuable in valves of large size. A resilient plug of large diameter would not hold its shape over the entire top of the plug to fulfill its desired function in my improved valve if it were not for this reinforcement almost out to the very edge of the top of the plug.

The curved and flared portion 22d near the bottom of stem portion 22 has another function. If the sealing plug is off center just before it moves into the bore 13, due to faulty construction or worn parts or otherwise, the surface 22d will engage the lowermost wall of the bore 13 and cam the sealing plug into a centered position.

What I claim is:

1. A valve comprising a housing having a fluid inlet and a fluid outlet, there being a cylindrical bore in said housing intermediate said inlet and outlet and communicating with both of them, a resilient frusto-conical sealing plug having a base of smaller diameter than said bore insertable into one end of said bore and having a base of larger diameter than said bore, the diameter of said plug bases being so chosen with respect to the diameter of said bore that said plug when inserted into said one end of said bore, in substantially unstressed condition, meets said bore in annular line contact a material distance down the slanting sides of said plug from said base of smaller diameter toward said base of larger diameter, means holding said plug base of smaller diameter substantially rigid over the major portion of said base and leaving an annular non-rigid area of said plug radially outside said last named means and in the plane of said base of smaller diameter, said non-rigid annular area having a radial extent between approximately 0.005 and 0.015 inch, and means for moving said plug into and out of said one end of said bore.

2. A valve as in claim 1 wherein said frusto-conical plug flares outwardly from said base of smaller diameter toward said base of larger diameter at an angle between five and ten degrees, and said plug being of rubber-like material of approximately 50 to 75 durometer hardness.

References Cited in the file of this patent
UNITED STATES PATENTS

| | | |
|---|---|---|
| 318,247 | Harvey | May 19, 1885 |
| 591,072 | Bourne | Oct. 5, 1897 |
| 2,148,850 | Deakins | Feb. 28, 1939 |
| 2,473,591 | Killner | June 21, 1949 |
| 2,644,486 | Christensen | July 7, 1953 |
| 2,659,567 | Rand | Nov. 17, 1953 |